(12) United States Patent
Yu et al.

(10) Patent No.: US 10,447,986 B2
(45) Date of Patent: Oct. 15, 2019

(54) VISUAL SPECIAL EFFECT IMAGE OR VIDEO PAIR AND GENERATION METHOD AND DEVICE THEREFOR

(71) Applicant: Zhejiang University, Hangzhou, Zhejiang Province (CN)

(72) Inventors: Lu Yu, Hangzhou (CN); Wenhao Hong, Hangzhou (CN)

(73) Assignee: ZHEJIANG UNIVERSITY, Hangzhou, Zhejiang Province (CN)

( * ) Notice: Subject to any disclaimer, the term of this patent is extended or adjusted under 35 U.S.C. 154(b) by 156 days.

(21) Appl. No.: 15/309,166

(22) PCT Filed: Apr. 30, 2015

(86) PCT No.: PCT/CN2015/000298
§ 371 (c)(1),
(2) Date: Nov. 4, 2016

(87) PCT Pub. No.: WO2015/169101
PCT Pub. Date: Nov. 12, 2015

(65) Prior Publication Data
US 2017/0078639 A1   Mar. 16, 2017

(30) Foreign Application Priority Data

May 5, 2014   (CN) .......................... 2014 1 0188363
Apr. 28, 2015   (CN) .......................... 2015 1 0209900

(51) Int. Cl.
*H04N 9/47* (2006.01)
*H04N 7/18* (2006.01)
(Continued)

(52) U.S. Cl.
CPC ........... *H04N 13/122* (2018.05); *H04N 13/32* (2018.05)

(58) Field of Classification Search
None
See application file for complete search history.

(56) References Cited

U.S. PATENT DOCUMENTS

| 5,646,641 A | 7/1997 | Okamura et al. |
| 2007/0206112 A1* | 9/2007 | Hsieh ................. H04N 5/23212 348/362 |

(Continued)

FOREIGN PATENT DOCUMENTS

| CN | 102036087 A | 4/2011 |
| CN | 102710962 A | 10/2012 |
| CN | 103731655 A | 4/2014 |

OTHER PUBLICATIONS

Woods, Andrew, "Understanding Crosstalk in Stereoscopic Displays", 3DSA (Three-Dimensional System and Applications) Conference, Tokyo, Japan, May 28, 2010 (May 28, 2010).

(Continued)

*Primary Examiner* — Talha M Nawaz
(74) *Attorney, Agent, or Firm* — Muncy, Geissler, Olds & Lowe, P.C.

(57) ABSTRACT

Disclosed are a method and device for generating a visual special effect image or video pair. The method mainly comprises: at least modifying the brightness of at least one region of an image or video of at least one view, so that the polarity of brightness contrast of the region in the view to perimeter regions is opposite to the polarity of brightness contrast of a corresponding region in the other view to the perimeter regions, and the absolute value of the difference between the brightness contrast of the region in the view to the perimeter regions and the brightness contrast of a corresponding region in the other view to the perimeter regions is greater than a critical value; and obtaining a new image or video pair. When the obtained image or video pair is viewed separately using both eyes, a fluctuating lustre sensation appears in a processing region. The present invention can add a special visual effect for content viewed in a binocular display mode.

8 Claims, 6 Drawing Sheets

(51) Int. Cl.
   *H04N 13/122*    (2018.01)
   *H04N 13/32*     (2018.01)

(56) References Cited

U.S. PATENT DOCUMENTS

| | | | | |
|---|---|---|---|---|
| 2008/0226191 | A1* | 9/2008 | Ohwaki | G06T 5/004 382/264 |
| 2009/0040402 | A1 | 2/2009 | Tomita et al. | |
| 2010/0014773 | A1* | 1/2010 | Ito | G06T 5/004 382/266 |
| 2010/0310189 | A1* | 12/2010 | Wakazono | G06T 5/008 382/258 |
| 2012/0113222 | A1* | 5/2012 | Hata | H04N 13/122 348/43 |
| 2012/0140225 | A1* | 6/2012 | Baker | H04N 13/327 326/393 |
| 2012/0176404 | A1* | 7/2012 | Broughton | G06F 21/84 345/619 |
| 2013/0239057 | A1* | 9/2013 | Ubillos | G06F 3/04855 715/833 |

* cited by examiner

US 10,447,986 B2

VISUAL SPECIAL EFFECT IMAGE OR VIDEO PAIR AND GENERATION METHOD AND DEVICE THEREFOR

BACKGROUND OF THE INVENTION

1. Field of the Invention

The present invention relates to a visual special effect image or video pair suitable for binocular viewing, and a method and device for generating the visual special effect image or video pair suitable for binocular viewing.

2. Relevant Background

Currently, market-oriented 3D display approach mainly presents two-channel visual content to left and right eyes respectively. The viewer can stably fuse the two-channel visual content and generate three-dimensional sensation. Two eyes have a distance of about 6 cm, and thus see an object from two different positions and views. The difference in position of images projected to two eyes respectively is called binocular disparity. Generally, it is thought that two-channel visual content only have binocular disparity, but no other differences, such as difference in brightness, color and so on.

There are many ways to find correspondence between left and right view images for stereoscopic display. Two regions in correspondence are called corresponding regions for two views. The following are several common ways to find corresponding regions: 1) Depth map based method: Assume a point A in one view with location (mx, my). if the view's depth map and camera parameters are already known, we can find the corresponding point A' in the other view through formulation $$m'_x = m_x + \frac{ft_x}{Z},$$

where f is camera focal length and tx is the distance between two cameras. The location of point A' in the other view is (mx', my). Corresponding regions can be found based on corresponding points. 2) Content feature based matching algorithm: firstly, significant features are extracted from the two images. Local features are corner, edge, line, etc. Global features are polygon, image structure descriptor, etc. Then, features are represented by parameters. Finally, match the two images by the feature parameters and find corresponding regions. 3) Greyscale based matching algorithm: images are regarded as 2D signals. Matching relationship is found by calculating the correlation function of the two signals. Thus, corresponding regions are found for two images. The way to find corresponding regions is not limited to the above.

When difference of binocular images is little, our brain can fuse left and right views and have stable texture perception and determinate depth perception. The physiological and psychological study of binocular vision reveals that when the difference of binocular images is large, our brain can't fuse left and right views and thus have unstable texture perception and uncertain depth perception. Especially, when regions in binocular images have opposite brightness contrast polarities, and the absolute value of difference between two brightness contrasts exceeds a critical value, these regions are perceived with fluctuating lustre. This phenomenon is called binocular rivalry. The fluctuating lustre sensation is due to the nonuniform, unstable and time varying brightness sensation of the surface.

SUMMARY OF THE INVENTION

The present invention provides a visual special effect image or video pair suitable for binocular viewing, and a method and device for generating the visual special effect image or video pair suitable for binocular viewing.

The present invention employs the following technical solution:

The first object of the present invention is to provide a visual special effect image or video pair, in which the brightness contrasts (D1 and D2) of corresponding regions (Z1 and Z2) in left and right view for at least one region to perimeter regions (ZZ1 and ZZ2) have opposite polarities (P1 and P2), and the absolute value of the difference between two brightness contrasts of the regions in left and right views exceeds a critical value. So that when the image or video pair is viewed separately using both eyes, a visual special effect of fluctuating lustre sensation appears in that region.

The second object of the present invention is to a method for generating visual special effect image or video, comprising: modifying the brightness of at least one region Z1 in at least one view of left and right views, so that the polarity P1 of a brightness contrast D1 of Z1 to its perimeter region ZZ1 is opposite to the polarity P2 of a brightness contrast D2 of a corresponding region Z2 in the other view to the perimeter region ZZ2 of left and right views, and the absolute value of the difference between the brightness contrast of the region in the view to the perimeter region and the brightness contrast of the corresponding region in the other view to the perimeter region exceeds a critical value; and obtaining a new image or video pair.

The preferred brightness modification further comprises: Modifying the brightness of pixels in both the region Z1 and at least one neighboring region ZA1 in the perimeter.

The preferred brightness modification is one of the following ways:

1) Assume that the region to be modified in brightness is called Z1, region Z2 is the corresponding region of Z1 in the other view, the average brightness of perimeter region of Z1 is valued $\bar{L}_{S1}$, and the average brightness of perimeter region of Z2 is valued $\bar{L}_{S2}$; for a pixel in region Z1 $(x_1, y_1) \in Z_1$, its brightness value $L_i(x_1, y_1)$ adds $A(x_1, y_1)$ to be $L^*_i(x_1, y_1)$, and the average brightness of region Z1 becomes $\bar{L}^*_o(Z_1)$; for a pixel in region Z2 $(x_2, y_2) \in Z_2$, keep its brightness value $L_i(x_2, y_2)$ unchanged, or add the brightness value $L_i(x_2, y_2)$ with $B(x_2, y_2)$ to be $L^*_i(x_2, y_2)$, and the average brightness of region Z2 becomes $\bar{L}^*_o(Z_2)$; so that after the brightness modification, the inequality $(\bar{L}^*_o(Z_1) - \bar{L}_{S1})(\bar{L}^*_o(Z_2) - \bar{L}_{S2}) < 0$ satisfies, which means the polarity of the brightness contrast of region Z1 is opposite to the polarity of the brightness contrast of region Z2, and the absolute value of difference between two brightness contrasts exceeds a critical value; at least one of the added value $A(x_1, y_1)$ and $B(x_2, y_2)$ should not be zero;

2) Assume that the region to be modified in brightness is called Z1, region Z2 is the corresponding region of Z1 in the other view, the average brightness of perimeter region of Z1 is valued $\bar{L}_{S1}$, and the average brightness of perimeter region of Z2 is valued $\bar{L}_{S2}$; for a pixel in region Z1 $(x_1, y_1) \in Z_1$, its brightness value $L_i(x_1, y_1)$ multiplies $A(x_1, y_1)$ to be $L^*_i(x_1, y_1)$, and the average brightness of region Z1 becomes $\bar{L}^*_o(Z_1)$; for a pixel in region Z2 $(x_2, y_2) \in Z_2$, keep its brightness value $L_i(x_2, y_2)$ unchanged, or multiple its brightness value $L_i(x_2, y_2)$ by $B(x_2, y_2)$ to be $L^*_i(x_2, y_2)$, and the average brightness of region Z2 becomes $\overline{L}^*_o(Z_2)$; so that after the brightness modification, the inequality $(\overline{L}^*_o(Z_1)-\overline{L}_{S1})(\overline{L}^*_o(Z_2)-\overline{L}_{S2})<0$ satisfies, which means the polarity of the brightness contrast of region Z1 is opposite to the polarity of the brightness contrast of region Z2, and the absolute value of difference between two brightness contrasts exceeds a critical value; at least one of the multiplied value $A(x_1, y_1)$ and $B(x_2, y_2)$ should not be zero.

The preferred brightness modification further comprises: Keeping brightness of pixels on the frontiers of corresponding regions Z1 and Z2 unchanged and only modifying the brightness of pixels inside corresponding regions Z1 and Z2.

The third object of the present invention is to provide a device for generating visual special effect image or video pair, comprising:

An input module of left view and right view that inputs images of left view and right view to be processed;

A brightness contrast polarity reversal module that modifies brightness of at least one region Z1 in at least one view of left and right views in image or video pair, so that the polarity P1 of a brightness contrast D1 of Z1 to its perimeter region ZZ1 is opposite to the polarity P2 of a brightness contrast D2 of a corresponding region Z2 in the other view to the perimeter region ZZ2 of left and right views, and the absolute value of the difference between the brightness contrast of the region in the view to the perimeter region and the brightness contrast of the corresponding region in the other view to the perimeter region exceeds a critical value.

The preferred brightness modification, in the brightness contrast reversal module, comprises one of the following submodules:

1) Addition submodule: Assume that the region to be modified in brightness is called Z1, region Z2 is the corresponding region of Z1 in the other view, the average brightness of perimeter region of Z1 is valued $\overline{L}_{S1}$, and the average brightness of perimeter region of Z2 is valued $\overline{L}_{S2}$; for a pixel in region Z1 $(x_1, y_1) \in Z_1$, its brightness value $L_i(x_1, y_1)$ adds $A(x_1, y_1)$ to be $L^*_i(x_1, y_1)$, and the average brightness of region Z1 becomes $\overline{L}^*_o(Z_1)$; for a pixel in region Z2 $(x_2, y_2) \in Z_2$, keep its brightness value $L_i(x_2, y_2)$ unchanged, or add the brightness value $L_i(x_2, y_2)$ with $B(x_2, y_2)$ to be $L^*_i(x_2, y_2)$, and the average brightness of region Z2 becomes $\overline{L}^*_o(Z_2)$; so that after the brightness modification, the inequality $(\overline{L}^*_o(Z_1)-\overline{L}_{S1})(\overline{L}^*_o(Z_2)-\overline{L}_{S2})<0$ satisfies, which means the polarity of the brightness contrast of region Z1 is opposite to the polarity of the brightness contrast of region Z2, and the absolute value of difference between two brightness contrasts exceeds a critical value; at least one of the added value $A(x_1, y_1)$ and $B(x_2, y_2)$ should not be zero;

2) Multiplication submodule: Assume that the region to be modified in brightness is called Z1, region Z2 is the corresponding region of Z1 in the other view, the average brightness of perimeter region of Z1 is valued $\overline{L}_{S1}$, and the average brightness of perimeter region of Z2 is valued $\overline{L}_{S2}$; for a pixel in region Z1 $(x_1, y_1) \in Z_1$, its brightness value $L_i(x_1, y_1)$ multiplies $A(x_1, y_1)$ to be $L^*_i(x_1, y_1)$, and the average brightness of region Z1 becomes $\overline{L}^*_o(Z_1)$; for a pixel in region Z2 $(x_2, y_2) \in Z_2$, keep its brightness value $L_i(x_2, y_2)$ unchanged, or multiple its brightness value $L_i(x_2, y_2)$ by $B(x_2, y_2)$ to be $L^*_i(x_2, y_2)$, and the average brightness of region Z2 becomes $\overline{L}^*_o(Z_2)$; so that after the brightness modification, the inequality $(\overline{L}^*_o(Z_1)-\overline{L}_{S1})(\overline{L}^*_o(Z_2)-\overline{L}_{S2})<0$ satisfies, which means the polarity of the brightness contrast of region Z1 is opposite to the polarity of the brightness contrast of region Z2, and the absolute value of difference between two brightness contrasts exceeds a critical value; at least one of the multiplied value $A(x_1, y_1)$ and $B(x_2, y_2)$ should not be zero.

The preferred brightness modification, in the brightness contrast reversal module, further comprises: Keeping brightness of pixels on the frontiers of corresponding regions Z1 and Z2 unchanged and only modifying the brightness of pixels inside corresponding regions Z1 and Z2.

The beneficial effect of the present invention lies in:

When the image or video pair generated by the method or device described in the present invention is viewed in stereoscopic display, the view can get:

1) a metallic shine surface perception effect;

2) a nonuniform and time varying brightness perception effect;

3) a dynamic perception effect provided in static images.

BRIEF DESCRIPTION OF THE DRAWING

Other features and advantages of the present invention can be interpreted more clearly by the following preferred embodiments combined with drawings.

Brief description of the drawings herein are used to provide further understanding of the present invention, and constitute a part of this application. The exemplary embodiments and its description are used to illustrate the present invention, but not unduly limit the present invention. In the drawings.

DETAILED DESCRIPTION OF THE PREFERRED EMBODIMENTS

Embodiment 1

The embodiment of the present invention provides a visual special effect image or video pair.

The visual special effect image or video pair comprises: the brightness contrasts (D1 and D2) of corresponding regions (Z1 and Z2) in left and right view for at least one region to perimeter regions (ZZ1 and ZZ2) have opposite polarities (P1 and P2), and the absolute value of the difference between two brightness contrasts of the regions in left and right views exceeds a critical value. So that when the image or video pair is viewed separately using both eyes, a visual special effect of fluctuating lustre sensation appears in that region.

The corresponding regions can be either regions occupied in left and right view images by an object and inside the object boundary, or regions occupied in left and right view images by part of an object. Corresponding regions in left and right view images are not confined to the above two definitions. Briefly speaking, corresponding regions in left and right view images are target regions for generating special effect by this invention.

The following two concrete examples elaborate the visual special effect image or video pair.

Figure 3:
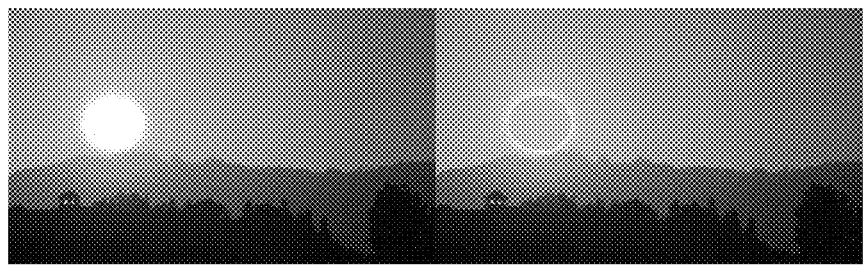
FIG. 3 illustrates the left and right view images of landscape with the sun after processing in the embodiment of the present invention.

FIG. 3 shows left and right view images, where regions occupied by the sun are corresponding regions for left and right view images. The perimeter regions are peripheral regions neighbor to the sun border. In left view, average brightness of the region occupied by the sun are greater than that of perimeter region; while in right view, average brightness of the region are smaller than that of perimeter region, so that polarities of brightness contrasts are opposite. And when the absolute value of difference between two brightness contrasts of average brightness of regions occupied by the sun to average brightness of perimeter regions in left and right view exceeds a critical value, a visual special effect of fluctuating lustre sensation appears in regions occupied by the sun due to binocular rivalry in stereoscopic display of left and right view. But regions that have fluctuating lustre effect don't have fluctuating lustre texture, or time and space varying complicated texture in each image of present image pair.

Figure 5:
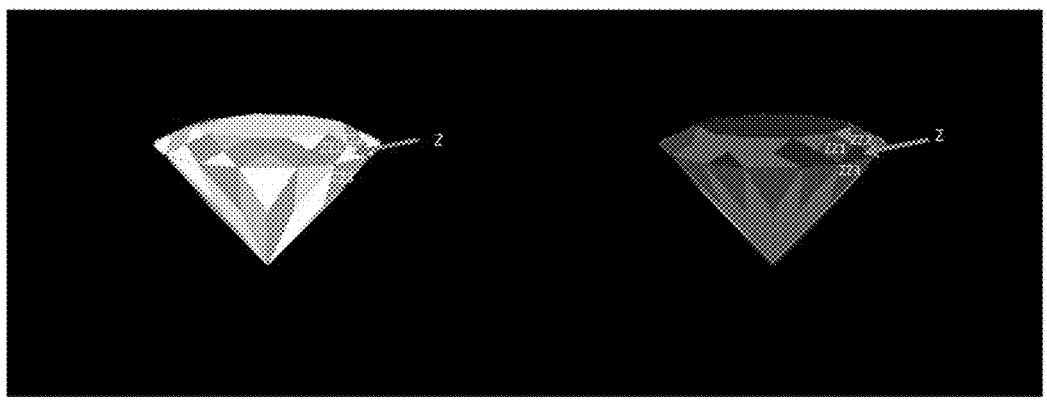
FIG. 5 illustrates the left and right view images of a diamond after processing in the embodiment of the present invention.

FIG. 5 shows left and right view images, where regions occupied by diamond facets are corresponding regions for left and right view images, e.g. facet Z in FIG. 5. The perimeter regions of facet Z are neighboring facet ZZ1, ZZ2 and ZZ3. In left and right view, the differences between average brightness of facet Z1 and average brightness of neighboring facet ZZ1, ZZ2 and ZZ3 have opposite polarities, so that polarities of brightness contrasts are opposite. When the absolute value of difference between brightness contrasts of average brightness of region Z1 to average brightness of perimeter regions ZZ1, ZZ2 and ZZ3 in left and right view exceeds a critical value, a visual special effect of fluctuating lustre sensation appears in facet Z due to binocular rivalry in stereoscopic display of left and right view. But regions that have fluctuating lustre effect don't have fluctuating lustre texture, or time and space varying complicated texture in each image of present image pair.

The obtained multi-view video pair, in which at least one frame is the visual special effect image pair mentioned above, is regarded as visual special effect video pair. Therefore, this invention is also applicable to videos.

Embodiment 2

The embodiment of the present invention provides a method for generating visual special effect image or video.

The method specifically comprises:

modifying the brightness of at least one region Z1 in at least one view of left and right views, so that the polarity P1 of a brightness contrast D1 of Z1 to its perimeter region ZZ1 is opposite to the polarity P2 of a brightness contrast D2 of a corresponding region Z2 in the other view to the perimeter region ZZ2 of left and right views, and the absolute value of the difference between the brightness contrast of the region in the view to the perimeter region and the brightness contrast of the corresponding region in the other view to the perimeter region exceeds a critical value; and obtaining a new image or video pair.

The corresponding regions can be either regions occupied in left and right view images by an object and inside the object boundary, or regions occupied in left and right view images by part of an object. Corresponding regions in left and right view images are not confined to the above two definitions. Briefly speaking, corresponding regions in left and right view images are target regions for generating special effect by this invention.

The following two concrete examples elaborate the visual special effect image or video pair.

Figure 2:
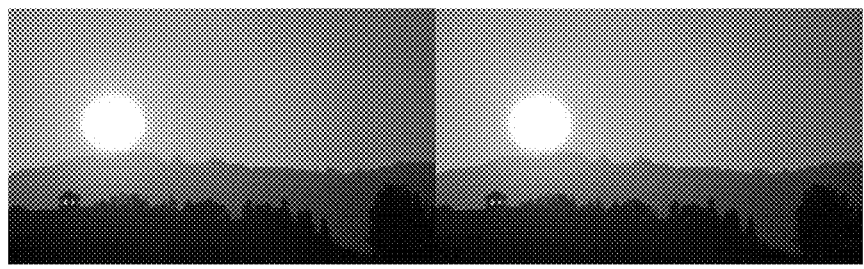
FIG. 2 illustrates the left and right view images of landscape with the sun before processing in the embodiment of the present invention.

FIG. 2 shows left and right view images before processing, and FIG. 3 shows left and right view images after processing. Regions occupied by the sun are corresponding regions in left and right view images. The perimeter regions are peripheral regions neighbor to the sun border. Before processing, in both left and right view, average brightness of the region occupied by the sun are greater than that of perimeter region. Modify the brightness of region occupied by the sun in the right view, to make average brightness of region occupied by the sun greater than that of perimeter region. So that after modification, brightness contrasts of regions occupied by the sun to perimeter regions in the left and right view have opposite polarities, and the absolute value of difference between two brightness contrasts of average brightness of regions occupied by the sun to average brightness of perimeter regions in left and right view exceeds a critical value. When the obtained left and right view image pair is viewed in stereoscopic display, a visual special effect of fluctuating lustre sensation appears in regions occupied by the sun due to binocular rivalry. But regions that have fluctuating lustre effect don't have fluctuating lustre texture, or time and space varying complicated texture in each image of present image pair.

Figure 4:
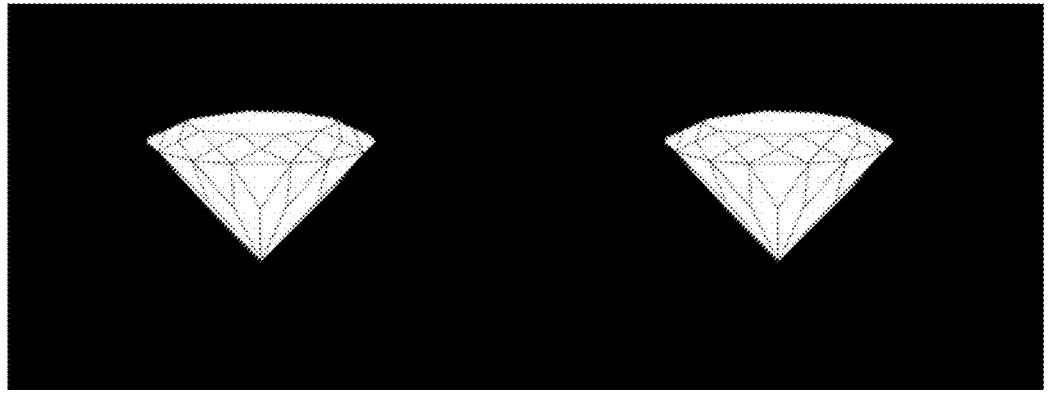
FIG. 4 illustrates the left and right view images of a diamond before processing in the embodiment of the present invention.

FIG. 4 shows left and right view images before processing, and FIG. 5 shows left and right view images after processing. Regions occupied by diamond facets are corresponding regions in left and right view images, e.g. facet Z in FIG. 5. The perimeter regions of facet Z are neighboring facet ZZ1, ZZ2 and ZZ3. Before processing, all diamond facets have same average brightness in left and right view, so brightness contrasts of facet Z in both left and right view equal zero. Modify the brightness of each facet in left and right view, so that brightness contrasts of average brightness of facet Z1 to average brightness of perimeter regions ZZ1, ZZ2 and ZZ3 in left and right view have opposite polarities, and the absolute value of difference between two brightness contrasts exceed a critical value. When the obtained left and right view image pair is viewed in stereoscopic display, a visual special effect of fluctuating lustre sensation appears in regions occupied by the sun due to binocular rivalry. But regions that have fluctuating lustre effect don't have fluctuating lustre texture, or time and space varying complicated texture in each image of present image pair.

The obtained multi-view video pair, in which at least one frame is the visual special effect image pair mentioned above, is regarded as visual special effect video pair. Therefore, this invention is also applicable to videos.

Embodiment 3

The embodiment of the present invention provides a method for generating visual special effect image or video.

The method specifically comprises:

modifying the brightness of at least one region Z1 in at least one view of left and right views, so that the polarity P1 of a brightness contrast D1 of Z1 to its perimeter region ZZ1 is opposite to the polarity P2 of a brightness contrast D2 of a corresponding region Z2 in the other view to the perimeter region ZZ2 of left and right views, and the absolute value of the difference between the brightness contrast of the region in the view to the perimeter region and the brightness contrast of the corresponding region in the other view to the perimeter region exceeds a critical value; and obtaining a new image or video pair.

Before modification processing, if input is 2D image or video, duplicate it to be at least two view images or videos; if input are two channel 3D images or videos, the two are regarded as left and right view; if input are multi-view images or videos, select any two channel images among multi-view contents to be left and right view; if input are depth image based rendering contents, select any two channel images among depth image based rendering contents to be left and right view.

Figure 6:
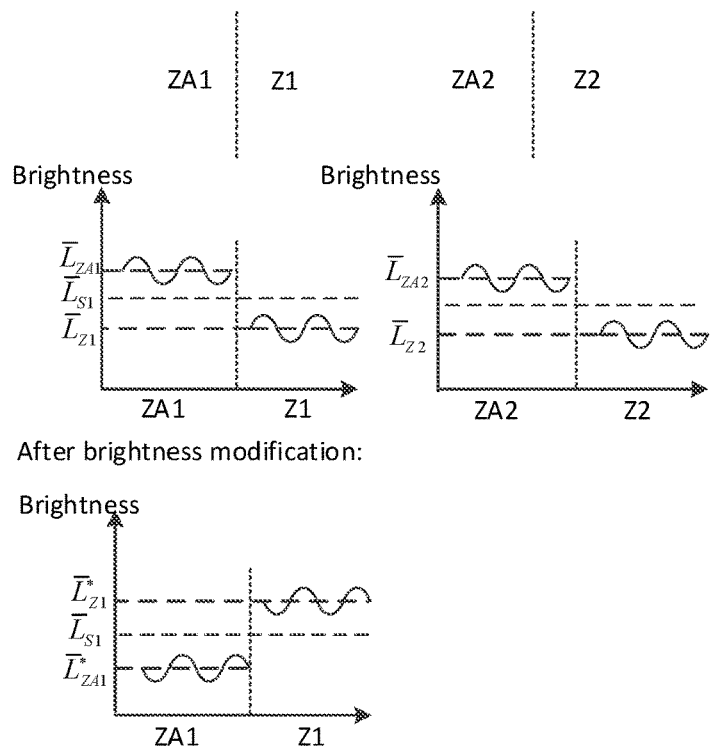
FIG. 6 illustrates an example of brightness modification for a region in the embodiment of the present invention.

Detailed modification is:

Modify the brightness of pixels in both the region Z1 and at least one neighboring region ZA1 in the perimeter;

Specifically, as shown in FIG. 6, region Z1 and region ZA1 are neighboring regions in a view, and region Z2 and region ZA2 are corresponding regions in the other view of region Z1 and region ZA1 respectively. Assume that $\bar{L}_{Z1}$ and $\bar{L}_{ZA1}$ are average brightness of region Z1 and region ZA1 respectively, $\bar{L}_{S1}$ is the average brightness of region Z1 and region ZA1, and $\bar{L}_{Z2}$ and $\bar{L}_{ZA2}$ are average brightness of region Z2 and region ZA2. Before brightness modification, brightness contrasts of region Z1 and Z2 to region ZA1 and ZA2 in left and right view have same polarity, namely $(\bar{L}_{Z1}-\bar{L}_{ZA1})(\bar{L}_{Z2}-\bar{L}_{ZA2})>0$, so fluctuating lustre sensation would not appear. Reverse the brightness of pixels in region Z1 with the average brightness $\bar{L}_{S1}$ of both region Z1 and region ZA1, to make average brightness of region Z1 be $\bar{L}^*_{Z1}=2\bar{L}_{S1}-\bar{L}_{Z1}=\bar{L}_{ZA1}$; reverse the brightness of pixels in region ZA1 with the average brightness $\bar{L}_{S1}$ of both region Z1 and region ZA1, to make average brightness of region ZA1 be $\bar{L}^*_{ZA1}=2\bar{L}_{S1}-\bar{L}_{ZA1}=\bar{L}_{Z1}$; after brightness modification, $(\bar{L}^*_{Z1}-\bar{L}^*_{ZA1})(\bar{L}_{Z2}-\bar{L}_{ZA2})<0$, where $\bar{L}_{Z2}$ and $\bar{L}_{ZA2}$ are average brightness of region Z2 and region ZA2, so that the polarity of brightness contrast of region Z1 to region ZA1 is opposite to the polarity of brightness contrast of region Z2 to region ZA2, and the absolute value of difference between two brightness contrasts exceeds a critical value.

This brightness modification method guarantees the total average brightness of target region unchanged.

This example is only a realization of brightness modification method. There are other different realizations, but just another one or a combination realization should be the method of patent subject matter.

For multi-view videos, modify brightness of at least one frame in left and right view video by the above method. The obtained video pair is also viewed with fluctuating lustre in stereoscopic display. Therefore, the invention is also applicable to videos.

Embodiment 4

The embodiment of the present invention provides a method for generating visual special effect image or video.

The method specifically comprises:

modifying the brightness of at least one region Z1 in at least one view of left and right views, so that the polarity P1 of a brightness contrast D1 of Z1 to its perimeter region ZZ1 is opposite to the polarity P2 of a brightness contrast D2 of a corresponding region Z2 in the other view to the perimeter region ZZ2 of left and right views, and the absolute value of the difference between the brightness contrast of the region in the view to the perimeter region and the brightness contrast of the corresponding region in the other view to the perimeter region exceeds a critical value; and obtaining a new image or video pair.

Before modification processing, if input is 2D image or video, duplicate it to be at least two view images or videos; if input are two channel 3D images or videos, the two are regarded as left and right view; if input are multi-view images or videos, select any two channel images among multi-view contents to be left and right view; if input are depth image based rendering contents, select any two channel images among depth image based rendering contents to be left and right view.

Under normal circumstances, in unprocessed image pair, brightness contrasts of corresponding regions to perimeter regions in left and right view are of same polarity. That is to say average brightness of the regions in left and right view are both greater or both smaller than average brightness of perimeter regions. Therefore, the invention needs to modify brightness of at least one region in at least one view image, to make brightness contrasts of the regions in left and right view have opposite polarities, and the absolute value of difference between two brightness contrasts exceeds a critical value.

Detailed modification is:

Assume that the region to be modified in brightness is called Z1, region Z2 is the corresponding region of Z1 in the other view, the average brightness of perimeter region of Z1 is valued $\bar{L}_{S1}$, and the average brightness of perimeter region of Z2 is valued $\bar{L}_{S2}$; for a pixel in region Z1 $(x_1, y_1)\in Z_1$, its brightness value $L_i(x_1, y_1)$ adds $A(x_1, y_1)$ to be $L^*_i(x_1, y_1)$, and the average brightness of region Z1 becomes $\bar{L}^*_o(Z_1)$; for a pixel in region Z2 $(x_2, y_2)\in Z_2$, keep its brightness value $L_i(x_2, y_2)$ unchanged, or add the brightness value $L_i(x_2, y_2)$ with $B(x_2, y_2)$ to be $L^*_i(x_2, y_2)$, and the average brightness of region Z2 becomes $\bar{L}^*_o(Z_2)$; so that after the brightness modification, the inequality $(\bar{L}^*_o(Z_1)-\bar{L}_{S1})(\bar{L}^*_o(Z_2)-\bar{L}_{S2})<0$ satisfies, which means the polarity of the brightness contrast of region Z1 is opposite to the polarity of the brightness contrast of region Z2, and the absolute value of difference between two brightness contrasts exceeds a critical value; at least one of the added value $A(x_1, y_1)$ and $B(x_2, y_2)$ should not be zero;

$A(x_1, y_1)$ and $B(x_2, y_2)$ can be constants. That is, brightness of every pixel in region Z1 adds or extracts a unified offset A, and brightness of every pixel in corresponding region Z2 adds or extracts a unified offset B. $A(x_1, y_1)$ and $B(x_2, y_2)$ can also be monotonous functions along a certain direction. The scope of function $A(x_1, y_1)$ and $B(x_2, y_2)$ can be either all pixels or part pixels in region Z1 and its corresponding region Z2. It should keep the texture in corresponding regions in left and right view unchanged after modification, and satisfy that brightness contrasts of corresponding regions to their perimeter regions have opposite polarities and the absolute value of difference between two brightness contrasts exceeds a critical value.

This brightness modification method guarantees the texture of target regions unchanged.

Figure 7:
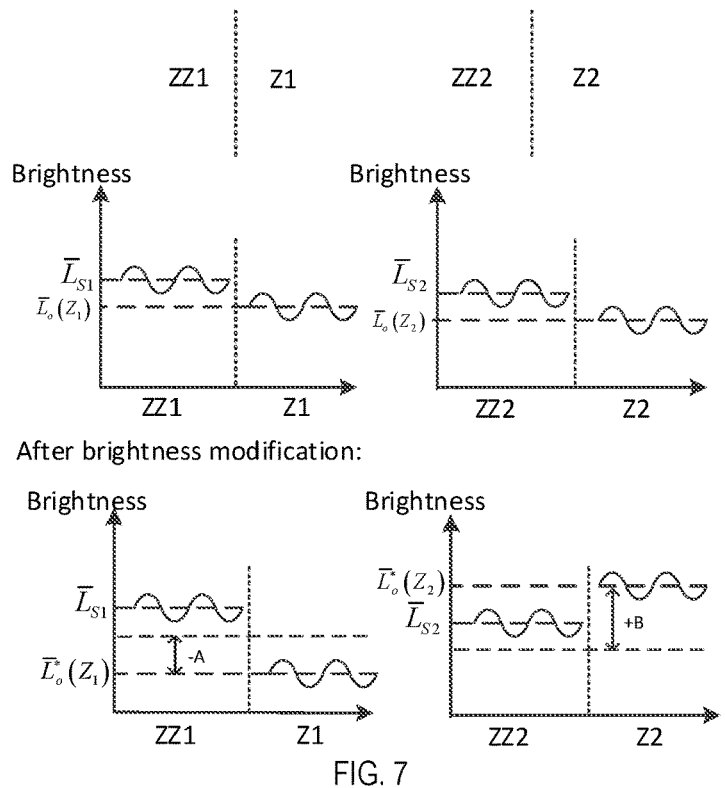
FIG. 7 illustrates an example of brightness modification for a region in the embodiment of the present invention.

Specifically, as shown in FIG. 7, assume that target regions Z1 and Z2 are corresponding regions in left and right view, regions ZZ1 and ZZ2 are perimeter regions of Z1 and Z2 respectively, $\bar{L}_o(Z_1)$ and $\bar{L}_o(Z_2)$ are average brightness of target regions Z1 and Z2 respectively, and $\bar{L}_{S1}$, $\bar{L}_{S2}$ are average brightness of perimeter regions ZZ1 and ZZ2 respectively. Before brightness modification, brightness contrasts of region Z1 and Z2 to region ZA1 and ZA2 in left and right view have same polarity, namely $(\bar{L}_o(Z_1)-\bar{L}_{S1})(\bar{L}_o(Z_2)-\bar{L}_{S2})>0$, so fluctuating lustre sensation would not appear. Brightness of pixels in region Z1 extracts an offset A, to make the average brightness be $\overline{L}^*_o(Z_1)=\overline{L}_o(Z_1)-A$; brightness of pixels in region Z2 adds an offset B, to make the average brightness be $\overline{L}^*_o(Z_2)=\overline{L}_o(Z_2)+B$. The original texture of region Z1 and Z2 are preserved. After brightness modification of corresponding regions Z1 and Z2, brightness contrasts of these corresponding regions in left and right view have opposite polarities, namely $(\overline{L}^*_o(Z_1)-\overline{L}_{S1})(\overline{L}^*_o(Z_2)-\overline{L}_{S2})<0$, and the absolute value of difference between two brightness contrasts exceeds a critical value.

This example is only a realization of brightness modification method. There are other different realizations, but just another one or a combination realization should be the method of patent subject matter.

For multi-view videos, modify brightness of at least one frame in left and right view video by the above method. The obtained video pair is also viewed with fluctuating lustre in stereoscopic display. Therefore, the invention is also applicable to videos.

Embodiment 5

The embodiment of the present invention provides a method for generating visual special effect image or video.

The method specifically comprises:

modifying the brightness of at least one region Z1 in at least one view of left and right views, so that the polarity P1 of a brightness contrast D1 of Z1 to its perimeter region ZZ1 is opposite to the polarity P2 of a brightness contrast D2 of a corresponding region Z2 in the other view to the perimeter region ZZ2 of left and right views, and the absolute value of the difference between the brightness contrast of the region in the view to the perimeter region and the brightness contrast of the corresponding region in the other view to the perimeter region exceeds a critical value; and obtaining a new image or video pair.

Before modification processing, if input is 2D image or video, duplicate it to be at least two view images or videos; if input are two channel 3D images or videos, the two are regarded as left and right view; if input are multi-view images or videos, select any two channel images among multi-view contents to be left and right view; if input are depth image based rendering contents, select any two channel images among depth image based rendering contents to be left and right view.

Under normal circumstances, in unprocessed image pair, brightness contrasts of corresponding regions to perimeter regions in left and right view are of same polarity. That is to say average brightness of the regions in left and right view are both greater or both smaller than average brightness of perimeter regions. Therefore, the invention needs to modify brightness of at least one region in at least one view image, to make brightness contrasts of the regions in left and right view have opposite polarities, and the absolute value of difference between two brightness contrasts exceeds a critical value.

Detailed modification is:

Assume that the region to be modified in brightness is called Z1, region Z2 is the corresponding region of Z1 in the other view, the average brightness of perimeter region of Z1 is valued $\overline{L}_{S1}$, and the average brightness of perimeter region of Z2 is valued $\overline{L}_{S2}$; for a pixel in region Z1 $(x_1, y_1) \in Z_1$, its brightness value $L_i(x_1, y_1)$ multiplies $A(x_1, y_1)$ to be $L^*_i(x_1, y_1)$, and the average brightness of region Z1 becomes $\overline{L}^*_o(Z_1)$; for a pixel in region Z2 $(x_2, y_2) \in Z_2$, keep its brightness value $L_i(x_2, y_2)$ unchanged, or multiple its brightness value $L_i(x_2, y_2)$ by $B(x_2, y_2)$ to be $L^*_i(x_2, y_2)$, and the average brightness of region Z2 becomes $\overline{L}^*_o(Z_2)$; so that after the brightness modification, the inequality $(\overline{L}^*_o(Z_1)-\overline{L}_{S1})(\overline{L}^*_o(Z_2)-\overline{L}_{S2})<0$ satisfies, which means the polarity of the brightness contrast of region Z1 is opposite to the polarity of the brightness contrast of region Z2, and the absolute value of difference between two brightness contrasts exceeds a critical value; at least one of the multiplied value $A(x_1, y_1)$ and $B(x_2, y_2)$ should not be zero.

$A(x_1, y_1)$ and $B(x_2, y_2)$ can be constants. That is, brightness of every pixel in region Z1 multiplies a unified value A, and brightness of every pixel in corresponding region Z2 multiplies a unified value B. $A(x_1, y_1)$ and $B(x_2, y_2)$ can also be monotonous functions along a certain direction. The scope of function $A(x_1, y_1)$ and $B(x_2, y_2)$ can be either all pixels or part pixels in region Z1 and its corresponding region Z2. It should keep the texture in corresponding regions in left and right view unchanged after modification, and satisfy that brightness contrasts of corresponding regions to their perimeter regions have opposite polarities and the absolute value of difference between two brightness contrasts exceeds a critical value.

This brightness modification method enhances the texture contrast of target regions.

Figure 8:
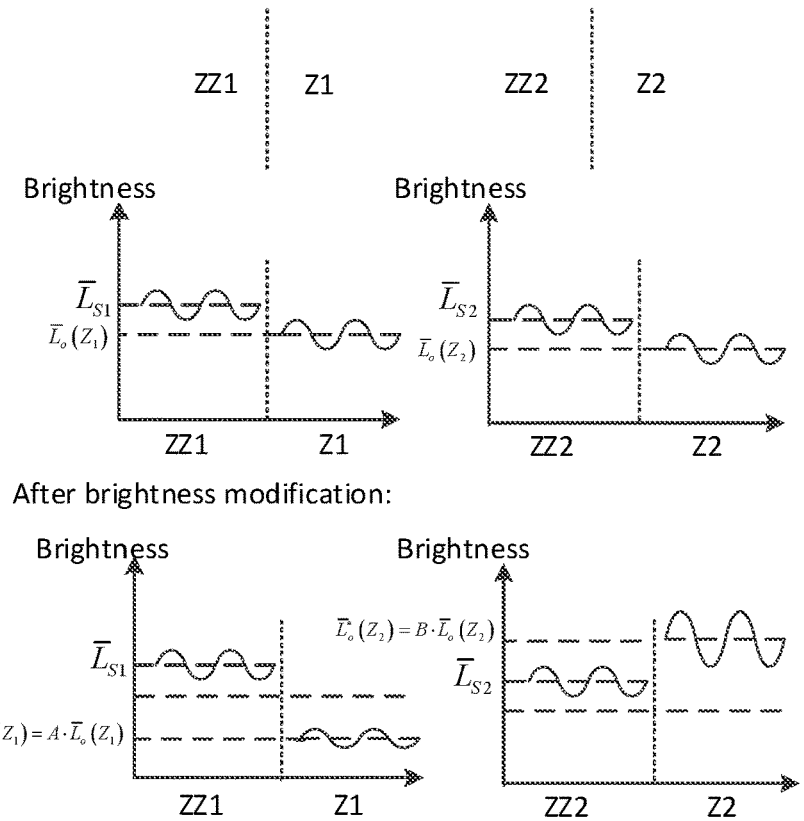
FIG. 8 illustrates an example of brightness modification for a region in the embodiment of the present invention.

Specifically, as shown in FIG. 8, assume that target regions Z1 and Z2 are corresponding regions in left and right view, regions ZZ1 and ZZ2 are perimeter regions of Z1 and Z2 respectively, $\overline{L}_o(Z_1)$ and $\overline{L}_o(Z_2)$ are average brightness of target regions Z1 and Z2 respectively, and $\overline{L}_{S1}$, $\overline{L}_{S2}$ are average brightness of perimeter regions ZZ1 and ZZ2 respectively. Before brightness modification, brightness contrasts of region Z1 and Z2 to region ZA1 and ZA2 in left and right view have same polarity, namely $(\overline{L}_o(Z_1)-\overline{L}_{S1})(\overline{L}_o(Z_2)-\overline{L}_{S2})>0$, so fluctuating lustre sensation would not appear. Brightness of pixels in region Z1 multiplies a value A, to make average brightness be $\overline{L}^*_o(Z_1)=A \cdot \overline{L}_o(Z_1)$; brightness of pixels in region multiplies a value B, to make average brightness be $\overline{L}^*_o(Z_2)=B \cdot \overline{L}_o(Z_2)$. The original texture of region Z1 and Z2 are preserved. After brightness modification of corresponding regions Z1 and Z2, brightness contrasts of these corresponding regions in left and right view have opposite polarities, namely $(\overline{L}^*_o(Z_1)-\overline{L}_{S1})(\overline{L}^*_o(Z_2)-\overline{L}_{S2})<0$, and the absolute value of difference between two brightness contrasts exceeds a critical value.

This example is only a realization of brightness modification method. There are other different realizations, but just another one or a combination realization should be the method of patent subject matter.

For multi-view videos, modify brightness of at least one frame in left and right view video by the above method. The obtained video pair is also viewed with fluctuating lustre in stereoscopic display. Therefore, the invention is also applicable to videos.

Embodiment 6

The embodiment of the present invention provides a method for generating visual special effect image or video.

The method specifically comprises:

modifying the brightness of at least one region Z1 in at least one view of left and right views, so that the polarity P1 of a brightness contrast D1 of Z1 to its perimeter region ZZ1 is opposite to the polarity P2 of a brightness contrast D2 of a corresponding region Z2 in the other view to the perimeter region ZZ2 of left and right views, and the absolute value of the difference between the brightness contrast of the region in the view to the perimeter region and the brightness contrast of the corresponding region in the other view to the perimeter region exceeds a critical value; and obtaining a new image or video pair.

Under normal circumstances, in unprocessed image pair, brightness contrasts of corresponding regions to perimeter regions in left and right view are of same polarity. That is to say average brightness of the regions in left and right view are both greater or both smaller than average brightness of perimeter regions. Therefore, the invention needs to modify brightness of at least one region in at least one view image, to make brightness contrasts of the regions in left and right view have opposite polarities, and the absolute value of difference between two brightness contrasts exceeds a critical value.

Visually establishing corresponding regions needs strong clue for binocular matching. Before brightness modification, keep brightness of pixels on the frontiers of corresponding regions unchanged, and only modify the brightness of pixels inside corresponding regions. Two regions with the same frontier can be easily matched in vision, so that after brightness modification, when the obtained image or video pair is viewed separately using both eyes, a visual special effect of fluctuating lustre sensation appears inside that region.

Embodiment 7

The embodiment of the present invention provides a method for generating visual special effect image or video.

The method specifically comprises:

modifying the brightness of at least one region Z1 in at least one view of left and right views, so that the polarity P1 of a brightness contrast D1 of Z1 to its perimeter region ZZ1 is opposite to the polarity P2 of a brightness contrast D2 of a corresponding region Z2 in the other view to the perimeter region ZZ2 of left and right views, and the absolute value of the difference between the brightness contrast of the region in the view to the perimeter region and the brightness contrast of the corresponding region in the other view to the perimeter region exceeds a critical value; and obtaining a new image or video pair.

Before modification processing, if input is 2D image or video, duplicate it to be at least two view images or videos; if input are two channel 3D images or videos, the two are regarded as left and right view; if input are multi-view images or videos, select any two channel images among multi-view contents to be left and right view; if input are depth image based rendering contents, select any two channel images among depth image based rendering contents to be left and right view.

Detailed modification is:

Modify the brightness of pixels in both the region Z1 and at least one neighboring region ZA1 in the perimeter.

Brightness modification of region Z1 and region ZA1 adopts methods same as embodiment 4 or embodiment 5.

Visually establishing corresponding regions needs strong clue for binocular matching. Before brightness modification, keep brightness of pixels on the frontiers of corresponding regions unchanged, and only modify the brightness of pixels inside corresponding regions. Two regions with the same frontier can be easily matched in vision, so that after brightness modification, when the obtained image or video pair is viewed separately using both eyes, a visual special effect of fluctuating lustre sensation appears inside that region.

Embodiment 8

The embodiment of the present invention provides a device for generating visual special effect image or video.

Figure 1:
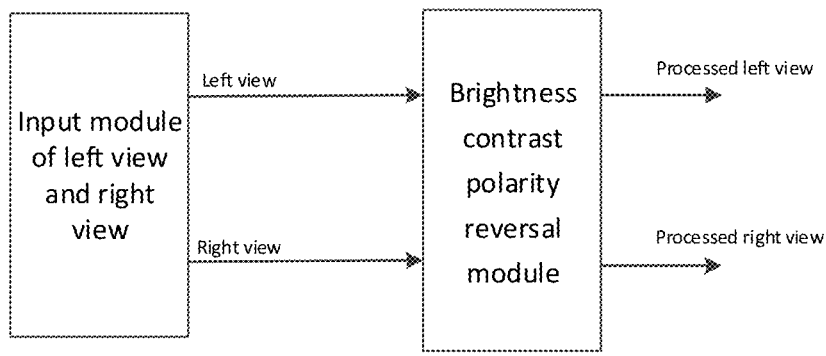
FIG. 1 is a block diagram of the device embodiment in the present invention.

FIG. 1 is a structure diagram of a device for generating visual special effect image or video pair of this embodiment. The device comprises two modules:

1) An input module of left view and right view: that inputs images of left view and right view;

2) A brightness contrast polarity reversal module: input are output of the input module of left view and right view, and output are left and right view image or video pair after processing. Its function is to modify the brightness of at least one region Z1 in at least one view of left and right views, so that the polarity P1 of a brightness contrast D1 of Z1 to its perimeter region ZZ1 is opposite to the polarity P2 of a brightness contrast D2 of a corresponding region Z2 in the other view to the perimeter region ZZ2 of left and right views, and the absolute value of the difference between the brightness contrast of the region in the view to the perimeter region and the brightness contrast of the corresponding region in the other view to the perimeter region exceeds a critical value; and obtaining a new image or video pair.

Embodiment 9

Figure 9:
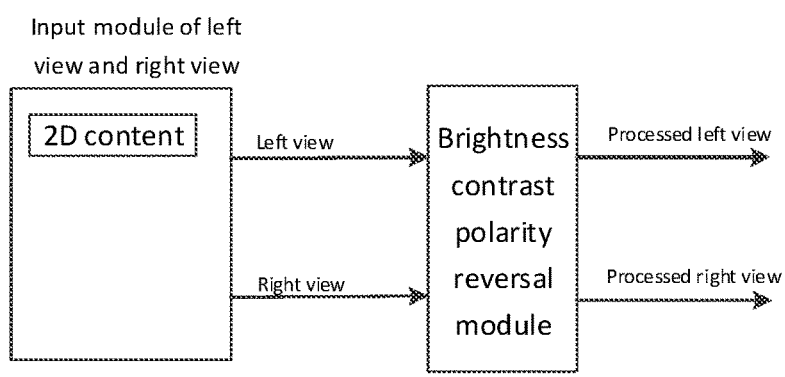
FIG. 9-15 are block diagrams of the device embodiments in the present invention.
Figure 10:
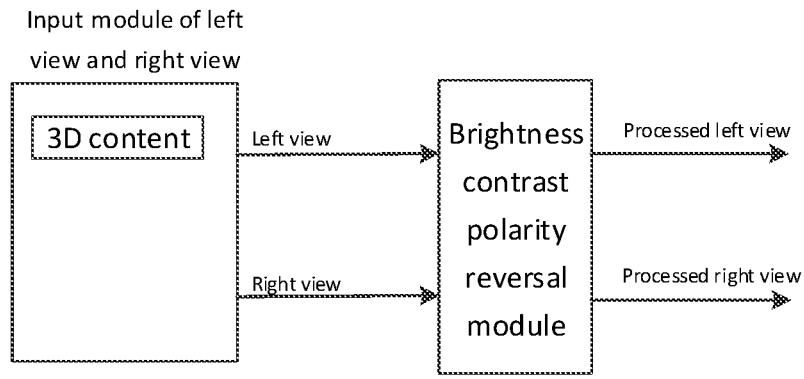
Figure 11:
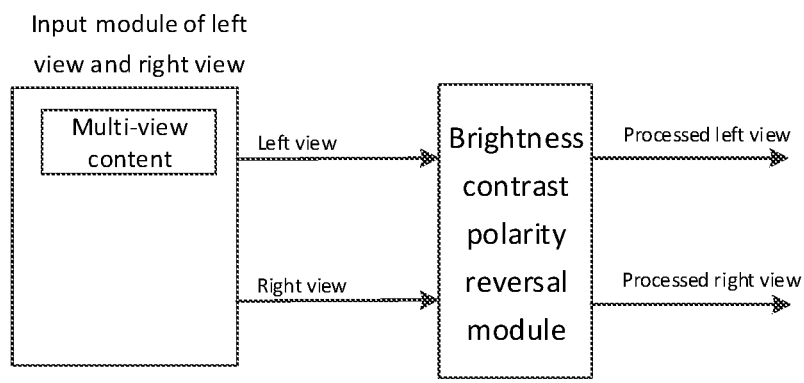
Figure 12:
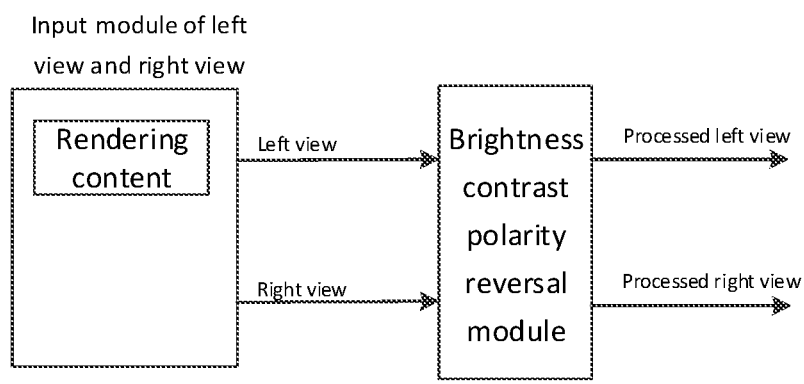

The embodiment of the present invention provides a device for generating visual special effect image or video. The device comprises two modules:

1) An input module of left view and right view: input can be one of the following four sorts of content: ① 2D content; ② two channel 3D content; ③ multi-view content; ④ depth image based rendering content. Output are left and right view image or video pair to be processed. Its function is that before brightness modification, if input is 2D image or video, duplicate it to be at least two view images or videos, as shown in FIG. 9; if input are two channel 3D images or videos, the two are regarded as left and right view, as shown in FIG. 10; if input are multi-view images or videos, select any two channel images among multi-view contents to be left and right view, as shown in FIG. 11; if input are depth image based rendering contents, select any two channel images among depth image based rendering contents to be left and right view, as shown in FIG. 12.

2) A brightness contrast polarity reversal module: input are output of the input module of left view and right view, and output are left and right view image or video pair after processing. Its function is to modify the brightness of at least one region Z1 in at least one view of left and right views, so that the polarity P1 of a brightness contrast D1 of Z1 to its perimeter region ZZ1 is opposite to the polarity P2 of a brightness contrast D2 of a corresponding region Z2 in the other view to the perimeter region ZZ2 of left and right views, and the absolute value of the difference between the brightness contrast of the region in the view to the perimeter region and the brightness contrast of the corresponding region in the other view to the perimeter region exceeds a critical value; and obtaining a new image or video pair.

Embodiment 10

The embodiment of the present invention provides a device for generating visual special effect image or video. The device comprises two modules:

1) An input module of left view and right view: input can be one of the following four sorts of content: ① 2D content; ② two channel 3D content; ③ multi-view content; ④ depth image based rendering content. Output are left and right view image or video pair to be processed. Its function is that before brightness modification, if input is 2D image or video, duplicate it to be at least two view images or videos, as shown in FIG. 9; if input are two channel 3D images or videos, the two are regarded as left and right view, as shown in FIG. 10; if input are multi-view images or videos, select any two channel images among multi-view contents to be left and right view, as shown in FIG. 11; if input are depth image based rendering contents, select any two channel images among depth image based rendering contents to be left and right view, as shown in FIG. 12.

2) A brightness contrast polarity reversal module: input are output of the input module of left view and right view, and output are left and right view image or video pair after processing. Its function is to modify the brightness of at least one region Z1 in at least one view of left and right views and the brightness of one of its perimeter regions ZA1. After brightness modification, the polarity P1 of a brightness contrast D1 of Z1 to its perimeter region ZZ1 is opposite to the polarity P2 of a brightness contrast D2 of a corresponding region Z2 in the other view to the perimeter region ZZ2 of left and right views, and the absolute value of the difference between the brightness contrast of the region in the view to the perimeter region and the brightness contrast of the corresponding region in the other view to the perimeter region exceeds a critical value; and obtain a new image or video pair.

Embodiment 11

The embodiment of the present invention provides a device for generating visual special effect image or video. The device comprises two modules:

1) An input module of left view and right view: input can be one of the following four sorts of content: ① 2D content; ② two channel 3D content; ③ multi-view content; ④ depth image based rendering content. Output are left and right view image or video pair to be processed. Its function is that before brightness modification, if input is 2D image or video, duplicate it to be at least two view images or videos; if input are two channel 3D images or videos, the two are regarded as left and right view; if input are multi-view images or videos, select any two channel images among multi-view contents to be left and right view; if input are depth image based rendering contents, select any two channel images among depth image based rendering contents to be left and right view.

Figure 13:
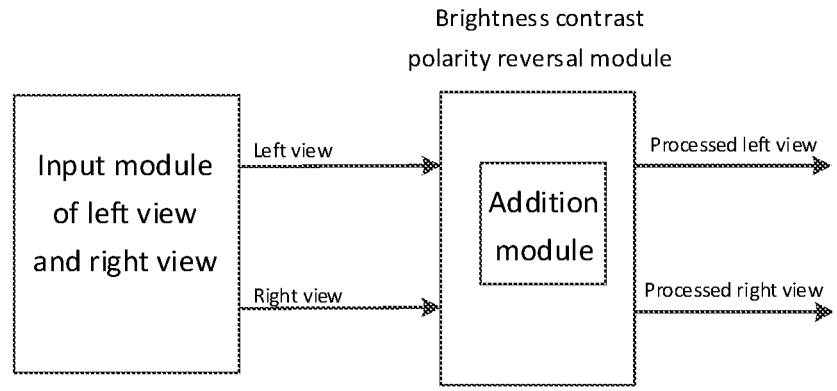
Figure 14:
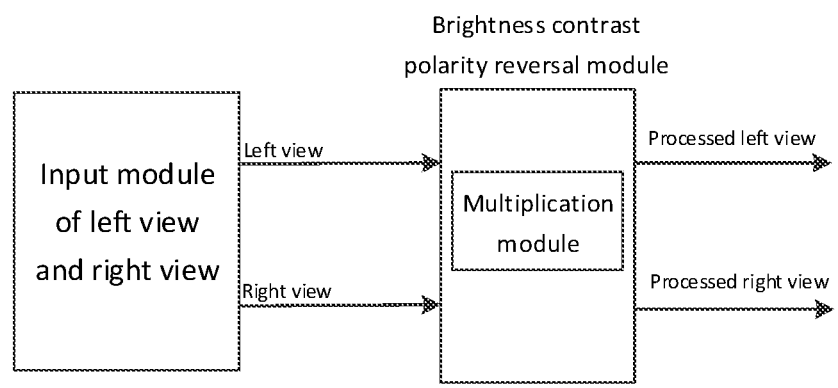
Figure 15:
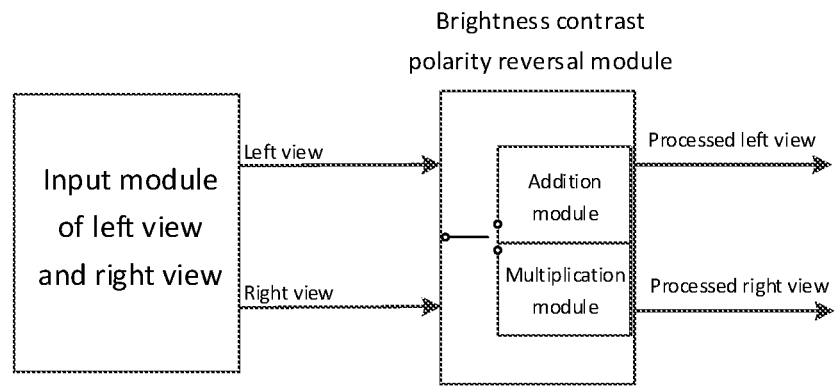

2) A brightness contrast polarity reversal module: input are output of the input module of left view and right view, and output are left and right view image or video pair after processing. It comprises addition submodule, multiplication submodule or combination of the two, as shown in FIG. 13-15.

The function of addition submodule is that assume that the region to be modified in brightness is called Z1, region Z2 is the corresponding region of Z1 in the other view, the average brightness of perimeter region of Z1 is valued $\overline{L}_{S1}$, and the average brightness of perimeter region of Z2 is valued $\overline{L}_{S2}$; for a pixel in region Z1 $(x_1, y_1) \in Z_1$, its brightness value $L_i(x_1, y_1)$ adds $A(x_1, y_1)$ to be $L^*_i(x_1, y_1)$, and the average brightness of region Z1 becomes $\overline{L}^*_o(Z_1)$; for a pixel in region Z2 $(x_2, y_2) \in Z_2$, keep its brightness value $L_i(x_2, y_2)$ unchanged, or add the brightness value $L_i(x_2, y_2)$ with $B(x_2, y_2)$ to be $L^*_i(x_2, y_2)$, and the average brightness of region Z2 becomes $\overline{L}^*_o(Z_2)$; so that after the brightness modification, the inequality $(\overline{L}^*_o(Z_1) - \overline{L}_{S1})(\overline{L}^*_o(Z_2) - \overline{L}_{S2}) < 0$ satisfies, which means the polarity of the brightness contrast of region Z1 is opposite to the polarity of the brightness contrast of region Z2, and the absolute value of difference between two brightness contrasts exceeds a critical value; at least one of the added value $A(x_1, y_1)$ and $B(x_2, y_2)$ should not be zero.

The function of multiplication submodule is that assume that the region to be modified in brightness is called Z1, region Z2 is the corresponding region of Z1 in the other view, the average brightness of perimeter region of Z1 is valued $\overline{L}_{S1}$, and the average brightness of perimeter region of Z2 is valued $\overline{L}_{S2}$; for a pixel in region Z1 $(x_1, y_1) \in Z_1$, its brightness value $L_i(x_1, y_1)$ multiplies $A(x_1, y_1)$ to be $L^*_i(x_1, y_1)$, and the average brightness of region Z1 becomes $\overline{L}^*_o(Z_1)$; for a pixel in region Z2 $(x_2, y_2) \in Z_2$, keep its brightness value $L_i(x_2, y_2)$ unchanged, or multiple its brightness value $L_i(x_2, y_2)$ by $B(x_2, y_2)$ to be $L^*_i(x_2, y_2)$, and the average brightness of region Z2 becomes $\overline{L}^*_o(Z_2)$; so that after the brightness modification, the inequality $(\overline{L}^*_o(Z_1) - \overline{L}_{S1})(\overline{L}^*_o(Z_2) - \overline{L}_{S2}) < 0$ satisfies, which means the polarity of the brightness contrast of region Z1 is opposite to the polarity of the brightness contrast of region Z2, and the absolute value of difference between two brightness contrasts exceeds a critical value; at least one of the multiplied value $A(x_1, y_1)$ and $B(x_2, y_2)$ should not be zero.

Embodiment 12

The embodiment of the present invention provides a device for generating visual special effect image or video. The device comprises two modules:

1) An input module of left view and right view: input can be one of the following four sorts of content: ① 2D content; ② two channel 3D content; ③ multi-view content; ④ depth image based rendering content. Output are left and right view image or video pair to be processed. Its function is that before brightness modification, if input is 2D image or video, duplicate it to be at least two view images or videos; if input are two channel 3D images or videos, the two are regarded as left and right view; if input are multi-view images or videos, select any two channel images among multi-view contents to be left and right view; if input are depth image based rendering contents, select any two channel images among depth image based rendering contents to be left and right view.

2) A brightness contrast polarity reversal module: input are output of the input module of left view and right view, and output are left and right view image or video pair after processing. Its function is to modify the brightness of at least one region Z1 in at least one view of left and right views and the brightness of one of its perimeter regions ZA1. After brightness modification, the polarity P1 of a brightness contrast D1 of Z1 to its perimeter region ZZ1 is opposite to the polarity P2 of a brightness contrast D2 of a corresponding region Z2 in the other view to the perimeter region ZZ2 of left and right views, and the absolute value of the difference between the brightness contrast of the region in the view to the perimeter region and the brightness contrast of the corresponding region in the other view to the perimeter region exceeds a critical value; and obtain a new image or video pair.

The brightness modification of region Z1 and one of its perimeter regions ZA1 comprises addition submodule, multiplication submodule or combination of the two. Assume that the region to be modified in brightness is called Z1, region Z2 is the corresponding region Z1 in the other view.

The function of addition submodule is that assume that the region to be modified in brightness is called Z1, region Z2 is the corresponding region of Z1 in the other view, the average brightness of perimeter region of Z1 is valued $\overline{L}_{S1}$, and the average brightness of perimeter region of Z2 is valued $\overline{L}_{S2}$; for a pixel in region Z1 $(x_1, y_1) \in Z_1$, its brightness value $L_i(x_1, y_1)$ adds $A(x_1, y_1)$ to be $L^*_i(x_1, y_1)$, and the average brightness of region Z1 becomes $\overline{L}^*_o(Z_1)$; for a pixel in region Z2 $(x_2, y_2) \in Z_2$, keep its brightness value $L_i(x_2, y_2)$ unchanged, or add the brightness value $L_i(x_2, y_2)$ with $(x_2, y_2)$ to be $L^*_i(x_2, y_2)$, and the average brightness of region Z2 becomes $\overline{L}^*_o(Z_2)$; so that after the brightness modification, the inequality $(\overline{L}^*_o(Z_1)-\overline{L}_{S1})(\overline{L}^*_o(Z_2)-\overline{L}_{S2})<0$ satisfies, which means the polarity of the brightness contrast of region Z1 is opposite to the polarity of the brightness contrast of region Z2, and the absolute value of difference between two brightness contrasts exceeds a critical value; at least one of the added value $A(x_1, y_1)$ and $B(x_2, y_2)$ should not be zero.

The function of multiplication submodule is that assume that the region to be modified in brightness is called Z1, region Z2 is the corresponding region of Z1 in the other view, the average brightness of perimeter region of Z1 is valued $\overline{L}_{S1}$, and the average brightness of perimeter region of Z2 is valued $\overline{L}_{S2}$; for a pixel in region Z1 $(x_1, y_1) \in Z_1$, its brightness value $L_i(x_1, y_1)$ multiplies $A(x_1, y_1)$ to be $L^*_i(x_1, y_1)$, and the average brightness of region Z1 becomes $\overline{L}^*_o(Z_1)$; for a pixel in region Z2 $(x_2, y_2) \in Z_2$, keep its brightness value $L_i(x_2, y_2)$ unchanged, or multiple its brightness value $L_i(x_2, y_2)$ by $B(x_2, y_2)$ to be $L^*_i(x_2, y_2)$, and the average brightness of region Z2 becomes $\overline{L}^*_o(Z_2)$; so that after the brightness modification, the inequality $(\overline{L}^*_o)(Z_1)-\overline{L}_{S1})(\overline{L}^*_o(Z_2)-\overline{L}_{S2})<0$ satisfies, which means the polarity of the brightness contrast of region Z1 is opposite to the polarity of the brightness contrast of region Z2, and the absolute value of difference between two brightness contrasts exceeds a critical value; at least one of the multiplied value $A(x_1, y_1)$ and $B(x_2, y_2)$ should not be zero.

It should be emphasized that, though embodiments mentioned above take images as example, it doesn't mean the invention is only applicable to images. This invention is also applicable to videos. Moreover, method for brightness modification of corresponding regions in left and right view can be a combination method of embodiment 3, embodiment 4 and embodiment 5.

It should be noted that: the above embodiments are merely provided for describing the technical solutions of the present invention, but not intended to limit it. Although reference to the embodiments of the present inventions has been described in detail, those skilled in the art will appreciate: it can still modify the foregoing technical solutions described in the embodiments, or equivalently replace some technical features; and such modifications or replacements do not make the essence of corresponding technical solutions depart from the scope of the technical solutions of the embodiments of the present invention.

The invention claimed is:

1. A method for generating a visual special effect image or video pair, comprising:
   modifying brightness of at least one region Z1 in at least one view of left and right views in an image or video pair, so that a polarity P1 of a brightness contrast D1 of the region Z1 to a perimeter region ZZ1 thereof is opposite to a polarity P2 of a brightness contrast D2 of a corresponding region Z2 in the other view to the perimeter region ZZ2 of the left and right views, and the absolute value of the difference between the brightness contrast of the region Z1 in the view to the perimeter region ZZ1 and the brightness contrast of the corresponding region Z2 in the other view to the perimeter region ZZ2 exceeds a critical value; and
   obtaining a new image or video pair based on the modification,
   wherein for the region to be modified in brightness, the brightness modification comprises one of two following ways:
   assuming that the region to be modified in brightness is called Z1, region Z2 is the corresponding region Z1 in the other view, average brightness of a perimeter region of the region Z1 is valued $\overline{L}_{S1}$, and average brightness of a perimeter region of the region Z2 is valued $\overline{L}_{S2}$;
      for a pixel in the region Z1 $(x_1, y_1) \in Z_1$, its brightness value $L_i(x_1, y_1)$ adds $A(x_1, y_1)$ to be $L^*_i(x_1, y_1)$, and the average brightness of the region Z1 becomes $\overline{L}^*_o(Z_1)$; for a pixel in the region Z2 $(x_2, y_2) \in Z_2$, keep its brightness value $L_i(x_2, y_2)$ unchanged, or add the brightness value $L_i(x_2, y_2)$ with $B(x_2, y_2)$ to be $L^*_i(x_2, y_2)$, and the average brightness of region Z2 becomes $\overline{L}^*_o(Z_2)$; so that after the brightness modification, $(\overline{L}^*_o(Z_1)-\overline{L}_{S1})(\overline{L}^*_o(Z_2)-\overline{L}_{S2})<0$, the polarity of the brightness contrast of the region Z1 is opposite to the polarity of the brightness contrast of the region Z2, and the absolute value of difference between two brightness contrasts exceeds a critical value; at least one of the added value $A(x_1, y_1)$ and $B(x_2, y_2)$ of corresponding regions should not be zero;
      for the pixel in the region Z1 $(x_1, y_1) \in Z_1$, its brightness value $L_i(x_1, y_1)$ multiplies $A(x_1, y_1)$ to be $L^*_i(x_1, y_1)$, and the average brightness of the region Z1 becomes $\overline{L}^*_o(Z_1)$; for a pixel in the region Z2 $(x_2, y_2) \in Z_2$, keep its brightness value $L_i(x_2, y_2)$ unchanged, or multiple its brightness value $L_i(x_2, y_2)$ by $B(x_2, y_2)$ to be $L^*_i(x_2, y_2)$, and the average brightness of region Z2 becomes $\overline{L}^*_o(Z_2)$; so that after the brightness modification, $(\overline{L}^*_o(Z_1)-\overline{L}_{S1})(\overline{L}^*_o(Z_2)-\overline{L}_{S2})<0$, the polarity of the brightness contrast of region Z1 is opposite to the polarity of the brightness contrast of the region Z2, and the absolute value of difference between two brightness contrasts exceeds a critical value; at least one of the multiplied value $A(x_1, y_1)$ and $B(x_2, y_2)$ of corresponding regions should not be zero.

2. A device for generating a visual special effect image or video pair, comprising:
   an input module of a left view and a right view that inputs images of the left view and the right view to be processed; and
   a brightness contrast polarity reversal module that modifies brightness of at least one region Z1 in at least one view of the left and right views in an image or video pair, so that a polarity P1 of a brightness contrast D1 of the region Z1 to a perimeter region ZZ1 there of is opposite to a polarity P2 of a brightness contrast D2 of a corresponding region Z2 in the other view to the perimeter region ZZ2 of the left and right views, and the absolute value of the difference between the brightness contrast of the region Z1 in the view to the perimeter region ZZ1 and the brightness contrast of the corresponding region Z2 in the other view to the perimeter region ZZ2 exceeds a critical value,
   wherein for the region to be modified in brightness, the brightness modification comprises one of following two submodules:
   an addition submodule, in which, assuming that the region to be modified in brightness is called Z1, region Z2 is the corresponding region Z1 in the other view, average brightness of a perimeter region of the region Z1 is valued $\overline{L}_{S1}$, and average brightness of a perimeter region of the region Z2 is valued $\overline{L}_{S2}$;

for a pixel in region Z1 $(x_1, y_1) \in Z_1$, its brightness value $L_i(x_1, y_1)$ adds $A(x_1, y_1)$ to be $L^*_i(x_1, y_1)$, and the average brightness of the region Z1 becomes $\overline{L}^*_o(Z_1)$;

for a pixel in region Z2 $(x_2, y_2) \in Z_2$, keep its brightness value $L_i(x_2, y_2)$ unchanged, or add the brightness value $L_i(x_2, y_2)$ with $B(x_2, y_2)$ to be $L^*_i(x_2, y_2)$, and the average brightness of region Z2 becomes $\overline{L}^*_o(Z_2)$; so that after the brightness modification, $(\overline{L}^*_o(Z_1)-\overline{L}_{S1})(\overline{L}^*_o(Z_2)-\overline{L}_{S2})<0$, the polarity of the brightness contrast of the region Z1 is opposite to the polarity of the brightness contrast of the region Z2, and the absolute value of difference between two brightness contrasts exceeds a critical value; at least one of the added value $A(x_1, y_1)$ and $B(x_2, y_2)$ of corresponding regions should not be zero;

a multiplication submodule, in which, for the pixel in the region Z1 $(x_1, y_1) \in Z_1$, its brightness value $L_i(x_1, y_1)$ multiplies $A(x_1, y_1)$ to be $L^*_i(x_1, y_1)$, and the average brightness of region Z1 becomes $\overline{L}^*_o(Z_1)$;

for the pixel in the region Z2 $(x_2, y_2) \in Z_2$, keep its brightness value $L_i(x_2, y_2)$ unchanged, or multiple its brightness value $L_i(x_2, y_2)$ by $B(x_2, y_2)$ to be $L^*_i(x_2, y_2)$, and the average brightness of region Z2 becomes $\overline{L}^*_o(Z_2)$; so that after the brightness modification, $(\overline{L}^*_o(Z_1)-\overline{L}_{S1})(\overline{L}^*_o(Z_2)-\overline{L}_{S2})<0$, the polarity of the brightness contrast of region Z1 is opposite to the polarity of the brightness contrast of the region Z2, and the absolute value of difference between two brightness contrasts exceeds a critical value; at least one of the multiplied value $A(x_1, y_1)$ and $B(x_2, y_2)$ of corresponding regions should not be zero.

3. A method for generating a visual special effect image or video pair, comprising:

modifying brightness of at least one region Z1 in at least one view of left and right views in an image or video pair, so that a polarity P1 of a brightness contrast D1 of the region Z1 to a perimeter region ZZ1 thereof is opposite to a polarity P2 of a brightness contrast D2 of a corresponding region Z2 in the other view to the perimeter region ZZ2 of the left and right views, and the absolute value of the difference between the brightness contrast of the region Z1 in the view to the perimeter region ZZ1 and the brightness contrast of the corresponding region Z2 in the other view to the perimeter region ZZ2 exceeds a critical value; and obtaining a new image or video pair based on the modification, wherein the brightness modification further comprises:

modifying brightness of pixels in both the region Z1 and at least one neighboring region ZA1 in the perimeter, and wherein for the region to be modified in brightness, the brightness modification comprises one of two following ways:

assuming that the region to be modified in brightness is called Z1, region Z2 is the corresponding region Z1 in the other view, average brightness of a perimeter region of the region Z1 is valued $\overline{L}_{S1}$, and average brightness of a perimeter region of the region Z2 is valued $\overline{L}_{S2}$;

for a pixel in the region Z1 $(x_1, y_1) \in Z_1$, its brightness value $L_i(x_1, y_1)$ adds $A(x_1, y_1)$ to be $L^*_i(x_1, y_1)$, and the average brightness of the region Z1 becomes $\overline{L}^*_o(Z_1)$; for a pixel in the region Z2 $(x_2, y_2) \in Z_2$, keep its brightness value $L_i(x_2, y_2)$ unchanged, or add the brightness value $L_i(x_2, y_2)$ with $B(x_2, y_2)$ to be $L^*_i(x_2, y_2)$, and the average brightness of region Z2 becomes $\overline{L}^*_o(Z_2)$; so that after the brightness modification, $(\overline{L}^*_o(Z_1)-\overline{L}_{S1})(\overline{L}^*_o(Z_2)-\overline{L}_{S2})<0$, the polarity of the brightness contrast of the region Z1 is opposite to the polarity of the brightness contrast of the region Z2, and the absolute value of difference between two brightness contrasts exceeds a critical value; at least one of the added value $A(x_1, y_1)$ and $B(x_2, y_2)$ of corresponding regions should not be zero;

for the pixel in the region Z1 $(x_1, y_1) \in Z_1$, its brightness value $L_i(x_1, y_1)$ multiplies $A(x_1, y_1)$ to be $L^*_i(x_1, y_1)$, and the average brightness of the region Z1 becomes $\overline{L}^*_o(Z_1)$; for a pixel in the region Z2 $(x_2, y_2) \in Z_2$, keep its brightness value $L_i(x_2, y_2)$ unchanged, or multiple its brightness value $L_i(x_2, y_2)$ by $B(x_2, y_2)$ to be $L^*_i(x_2, y_2)$, and the average brightness of region Z2 becomes $\overline{L}^*_o(Z_2)$; so that after the brightness modification, $(\overline{L}^*_o(Z_1)-\overline{L}_{S1})(\overline{L}^*_o(Z_2)-\overline{L}_{S2})<0$, the polarity of the brightness contrast of region Z1 is opposite to the polarity of the brightness contrast of the region Z2, and the absolute value of difference between two brightness contrasts exceeds a critical value; at least one of the multiplied value $A(x_1, y_1)$ and $B(x_2, y_2)$ of corresponding regions should not be zero.

4. The method according to claim 1, wherein the brightness modification further comprises:

keeping brightness of pixels on frontiers of corresponding regions Z1 and Z2 unchanged and only modifying the brightness of pixels inside corresponding regions Z1 and Z2.

5. The method according to claim 3, wherein the brightness modification further comprises:

keeping brightness of pixels on frontiers of corresponding regions Z1 and Z2 unchanged and only modifying the brightness of pixels inside corresponding regions Z1 and Z2.

6. A method for generating a visual special effect image or video pair, comprising:

modifying brightness of at least one region Z1 in at least one view of left and right views in an image or video pair, so that a polarity P1 of a brightness contrast D1 of the region Z1 to a perimeter region ZZ1 thereof is opposite to a polarity P2 of a brightness contrast D2 of a corresponding region Z2 in the other view to the perimeter region ZZ2 of the left and right views, and the absolute value of the difference between the brightness contrast of the region Z1 in the view to the perimeter region ZZ1 and the brightness contrast of the corresponding region Z2 in the other view to the perimeter region ZZ2 exceeds a critical value; and obtaining a new image or video pair based on the modification, wherein the brightness modification further comprises:

modifying brightness of pixels in both the region Z1 and at least one neighboring region ZA1 in the perimeter; and keeping brightness of pixels on frontiers of corresponding regions Z1 and Z2 unchanged and only modifying the brightness of pixels inside corresponding regions Z1 and Z2, and wherein for the region to be modified in brightness, the brightness modification comprises one of two following submodules:

an addition submodule, in which, assuming that the region to be modified in brightness is called Z1, region Z2 is the corresponding region Z1 in the other view, average brightness of a perimeter region of the region Z1 is valued $\overline{L}_{S1}$, and average brightness of a perimeter region of the region Z2 is valued $\overline{L}_{S2}$;

for a pixel in region Z1 $(x_1, y_1) \in Z_1$, its brightness value $L_i(x_1, y_1)$ adds $A(x_1, y_1)$ to be $L^*_i(x_1, y_1)$, and the average brightness of the region Z1 becomes $\overline{L}^*_o(Z_1)$;

for a pixel in region Z2 $(x_2, y_2) \in Z_2$, keep its brightness value $L_i(x_2, y_2)$ unchanged, or add the brightness value $L_i(x_2, y_2)$ with $B(x_2, y_2)$ to be $L^*_i(x_2, y_2)$, and the average brightness of region Z2 becomes $\overline{L}^*_o(Z_2)$; so that after the brightness modification, $(\overline{L}^*_o(Z_1)-\overline{L}_{S1})(\overline{L}^*_o(Z_2)-\overline{L}_{S2})<0$, the polarity of the brightness contrast of the region Z1 is opposite to the polarity of the brightness contrast of the region Z2, and the absolute value of difference between two brightness contrasts exceeds a critical value; at least one of the added value $A(x_1, y_1)$ and $B(x_2, y_2)$ of corresponding regions should not be zero;

a multiplication submodule, in which, for the pixel in the region Z1 $(x_1, y_1) \in Z_1$, its brightness value $L_i(x_1, y_1)$ multiplies $A(x_1, y_1)$ to be $L^*_i(x_1, y_1)$, and the average brightness of region Z1 becomes $\overline{L}^*_o(Z_1)$;

for the pixel in the region Z2 $(x_2, y_2) \in Z_2$, keep its brightness value $L_i(x_2, y_2)$ unchanged, or multiple its brightness value $L_i(x_2, y_2)$ by $B(x_2, y_2)$ to be $L^*_i(x_2, y_2)$, and the average brightness of region Z2 becomes $\overline{L}^*_o(Z_2)$; so that after the brightness modification, $(\overline{L}^*_o(Z_1)-\overline{L}_{S1})(\overline{L}^*_o(Z_2)-\overline{L}_{S2})<0$, the polarity of the brightness contrast of region Z1 is opposite to the polarity of the brightness contrast of the region Z2, and the absolute value of difference between two brightness contrasts exceeds a critical value; at least one of the multiplied value $A(x_1, y_1)$ and $B(x_2, y_2)$ of corresponding regions should not be zero.

7. The device according to claim 2, wherein the brightness contrast polarity reversal module keeps brightness of pixels on frontiers of corresponding regions Z1 and Z2 unchanged and only modifying the brightness of pixels inside corresponding regions Z1 and Z2.

8. The device according to claim 6, wherein the brightness contrast polarity reversal module keeps brightness of pixels on frontiers of corresponding regions Z1 and Z2 unchanged and only modifying the brightness of pixels inside corresponding regions Z1 and Z2.

* * * * *